US008041312B2

(12) United States Patent
Endo

(10) Patent No.: US 8,041,312 B2
(45) Date of Patent: Oct. 18, 2011

(54) INFORMATION GUIDANCE SERVICE SYSTEM, INFORMATION GUIDANCE PROVIDING DEVICE, INFORMATION GUIDANCE SERVICE METHOD, AND RECORDING MEDIUM

(75) Inventor: Kazuo Endo, Tokyo (JP)

(73) Assignee: NEC Corporation, Tokyo (JP)

( * ) Notice: Subject to any disclaimer, the term of this patent is extended or adjusted under 35 U.S.C. 154(b) by 1458 days.

(21) Appl. No.: 11/172,596

(22) Filed: Jun. 30, 2005

(65) Prior Publication Data

US 2006/0004599 A1 Jan. 5, 2006

(30) Foreign Application Priority Data

Jun. 30, 2004 (JP) .................. 2004-192388

(51) Int. Cl.
*H04B 1/38* (2006.01)
*H04M 1/64* (2006.01)
*G06Q 10/00* (2006.01)
(52) U.S. Cl. .................. 455/90.2; 379/88.01; 705/1.1
(58) Field of Classification Search .................. 455/405, 455/518, 406, 416, 569.1, 90.2, 171.1; 705/40; 701/1; 379/191, 80, 88.01, 88.04; 370/352
See application file for complete search history.

(56) References Cited

U.S. PATENT DOCUMENTS

| 7,106,843 | B1 * | 9/2006 | Gainsboro et al. ............ 379/191 |
| 7,406,305 | B2 * | 7/2008 | Laybourn et al. ............. 455/405 |
| 2002/0004720 | A1 * | 1/2002 | Janoska ......................... 704/270 |
| 2003/0061160 | A1 * | 3/2003 | Asahina .......................... 705/40 |
| 2003/0065427 | A1 * | 4/2003 | Funk et al. ....................... 701/1 |
| 2004/0032843 | A1 | 2/2004 | Schaefer et al. |
| 2004/0224710 | A1 * | 11/2004 | Koskelainen et al. ......... 455/518 |
| 2007/0047515 | A1 * | 3/2007 | Jonsson et al. ................ 370/352 |

FOREIGN PATENT DOCUMENTS

| JP | 2002-5667 | 1/2002 |
| JP | 2002-135146 | 5/2002 |
| JP | 2002-255035 A | 9/2002 |
| JP | 2002-298284 A | 10/2002 |
| JP | 2003-259459 | 9/2003 |
| KR | 2003-0045894 | 6/2003 |

OTHER PUBLICATIONS

Anonymous, "Push to Talk Over Cellular (PoC)—Architecture", Internet Citation-Open Mobile Alliance (May 28, 2004), XP-002340306.
Patent Abstracts of Japan No. 2002-255035 publsihed on Sep. 11, 2002.
Japanese Official Action dated Oct. 19, 2010, together with a Partial English translation.

* cited by examiner

*Primary Examiner* — Kiet Doan
(74) *Attorney, Agent, or Firm* — Scully, Scott, Murphy & Presser, P.C.

(57) ABSTRACT

An information guidance service system according to the present invention provides a user terminal with information on a facility in use. The information guidance service system includes the user terminal having a push-to-talk over cellular (PoC) function of performing a transceiver-mode communications; a PoC server which controls the transceiver-mode communications with the PoC function to relay between the user terminal and an information guidance providing device; and the information guidance providing device for providing the information on the facility in use to the user terminal. The information guidance providing device includes a control circuit that controls to communicate with the user terminal via the PoC server and notify the user terminal of the information on the facility in use as a voice signal.

10 Claims, 9 Drawing Sheets

…………

INFORMATION GUIDANCE SERVICE SYSTEM, INFORMATION GUIDANCE PROVIDING DEVICE, INFORMATION GUIDANCE SERVICE METHOD, AND RECORDING MEDIUM

BACKGROUND OF THE INVENTION

1. Field of the Invention

The present invention relates to an information guidance service system, an information guidance providing device, an information guidance service method, and a recording medium. In particular, the invention relates to an information guidance service system, an information guidance providing device, an information guidance service method; and a recording medium, which are used for an information guidance service such as a transit guidance of a public transportation.

2. Description of the Related Art

Such an information guidance service, includes a transit guidance of a public transportation, an information guidance service on facilities around a station, in a downtown area, or the like, and an information guidance service on exhibits in a museum, an art gallery, or the like. Specific examples of the information guidance service include techniques disclosed in JP 2002-298284 A (hereinafter, referred to as "Document 1") and JP 2002-255035 A (hereinafter, referred to as "Document 2").

In a transit point guidance service according to Document 1, a portable navigation device sends to an information center a current position and a destination that are inputted through operation of an operation unit. The information center searches databases including train schedules and maps for a guide route from the current position to the destination, sets a transit point, and sends the resultant information to the portable navigation device.

In a transit guidance service according to Document 2, a cellular phone sends to a center device a departure station ID received from a departure-station-wicket-data transmitter, through which a non-contact IC card is passed, and a destination station ID received from a destination-station-list device. The center device checks the running status and sends a transit station and an arrival time at the transit station to a cellular phone.

However, the above-mentioned transit point guidance service using the portable navigation device according to Document 1, the current position and the destination need to be inputted through the operation of the operation unit, which leads to a problem in that the portable navigation device is not easy to input characters with and the operation takes much time. In addition, in the transit point guidance service using the portable navigation device according to Document 1, it requires much time to receive a large amount of data under constraints of communication line speed, which leads to a problem in that it takes much time and a large amount of communication line fees to obtain information.

Further, in the transit guidance service using the cellular phone according to Document 2, it is required that each station wicket has a departure-station-wicket-data transmitter, and that each station has several destination-station-list devices, which leads to a problem in that it requires huge cost to accomplish such a system.

Further, in the transit guidance service using the portable terminal as described in Documents 1 and 2, in order to collect service fees, the connection between the portable terminal and the center device needs to be held until the user arrives at the destination. With the configuration described in Documents 1 and 2, the communication is performed during the connection, and the charge is to be made according to the communication time. In the case where the long-hour communication is required to obtain information with such a charging-method-based on the communication time, the communication fees increase accordingly, which leads to a problem in that it takes much time and a large amount of communication fees to obtain information. The same problem occurs not only in the transit guidance service, but also in other types of information guidance service.

SUMMARY OF THE INVENTION

In order to solve the above-mentioned problem, an exemplary feature of the present invention is to provide an information guidance service system, an information, guidance providing device, an information guidance service method, computer program product used therefor capable of reducing time for obtaining information without providing the premises of each station or terminal with the device for obtaining information on a departure station or terminal and a destination station or terminal, thereby reducing communication line fees for obtaining the information.

In order to provide with the above feature, an information guidance service system according to the present invention provides a user terminal with information on a facility in use. The information guidance service system includes the user terminal having a push-to-talk over cellular (PoC) function of performing a transceiver-mode communications; a PoC server which controls the transceiver-mode communications with the PoC function to relay between the user terminal and an information guidance providing device; and the information guidance providing device for providing the information on the facility in use to the user terminal. The information guidance providing device includes a control circuit that controls to communicate with the user terminal via the PoC server and notify the user terminal of the information on the facility in use as a voice signal.

Further, in order to provide with the above feature, an information guidance providing device according to the present invention provides a user terminal with information on a facility in use. The information guidance providing device includes a control circuit that controls to communicate with the user terminal with a push-to-talk over cellular (PoC) communication and notify the user terminal of the information on the facility in use as a voice signal.

Further, in order to provide with the above feature, an information guidance service method according to the present invention provides a user terminal with information on a facility in use. The information guidance service method includes: controlling to communicate with the user terminal with a push-to-talk over cellular (PoC) communication and notify the user terminal of the information on the facility in use as a voice signal.

Further, in order to provide with the above feature, a recording medium according to the present invention for storing a program for causing a computer which provides a user terminal with information to execute the processing of controlling to communicate with the user terminal with a push-to-talk over cellular (PoC) communication and notify the user terminal of the information on a facility in use as a voice signal.

As described above, according to the information guidance service system of the present invention, the use of the PoC function of a cellular phone allows long-hour, continuous use at low cost. Accordingly, it is possible to achieve services convenient to the user.

In other words, the present invention is configured to use the PoC function of the user terminal to notify the user terminal with the information on the facility in use. Consequently, the present invention produces an effect that it is possible to reduce time for obtaining information without providing the premises of each station with the device for obtaining information on a departure station and a destination station, thereby reducing communication line fees for obtaining the information.

BRIEF DESCRIPTION OF THE DRAWINGS

These and other aspects, features and advantages of the invention will become more fully apparent from the following detailed description taken in conjunction with accompanying drawings. In the drawings.

DETAILED DESCRIPTION OF THE PREFERRED EMBODIMENTS

Detailed description will now be made of embodiments of the invention with reference to the drawings.

First Embodiment

Figure 1:
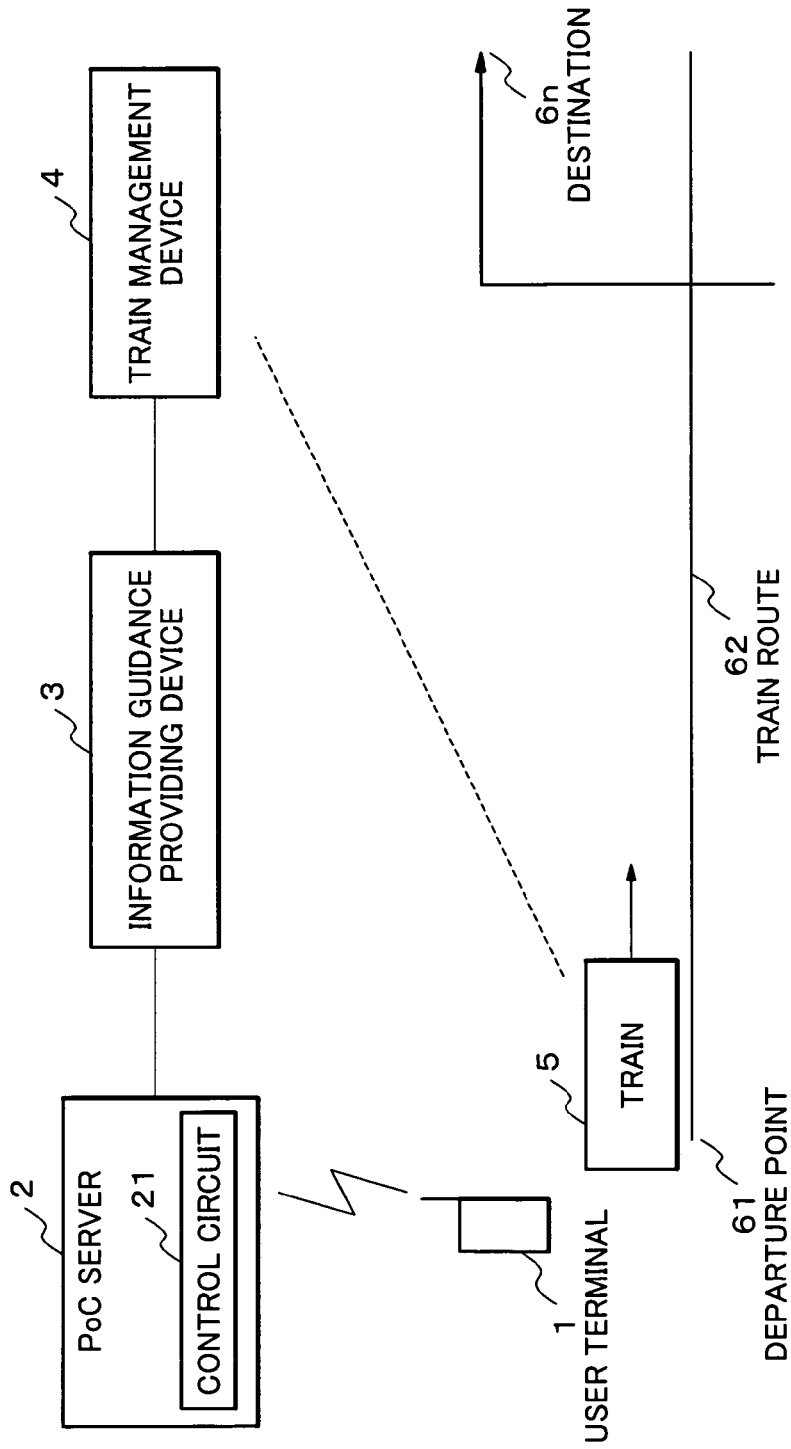
FIG. 1 is a block diagram showing a configuration of an information guidance service system according to a first embodiment of the present invention.

FIG. 1 is a block diagram showing a configuration of a system for performing an information guidance service according to a first embodiment of the present invention. FIG. 1 shows a system for providing a transit guidance service for a public transportation represented by a train 5.

Referring to FIG. 1, the system according to the first embodiment of the present invention includes a user terminal 1, a PoC server 2, an information guidance providing device 3, a train management device 4, and the train 5. Herein, the user terminal 1 is a cellular phone of a user who uses a service, and has a PoC function (not shown) for using a push-to-talk over cellular (PoC) service provided by the PoC server 2. The PoC server 2 provides the PoC service to the user terminal 1. The information guidance providing device 3 provides the information guidance service to the user terminal 1. The train management device 4 manages the running status of the train 5 etc.

The user terminal 1 connects to the PoC server 2 to perform communications with the information guidance providing device 3 via PoC. The information guidance providing device 3 provides the user terminal 1 with the time information on the train 5 and an information guidance via the PoC server 2. In addition, the user terminal 1 receives a transit information guidance as voice data while the user thereof is moving on the train 5 along a route defined by travel routes 61 to 6n. The information guidance providing device 3 learns a current position of the train 5 through the train management device 4, and provides the user terminal 1 with transit information and get-off information as voice data.

As described above, in the system according to this embodiment, the use of the PoC function provided to the user terminal 1 allows long-hour use of a guidance to information including the transit information and the get-off information. Further, the system according to this embodiment allows economical use of such a service, achieving services convenient to the user.

The PoC used herein is a kind of walkie talkie using an internet protocol (IP), allowing a conversation through one-way communications. Similarly to internet messaging (IM), the PoC allows grouping of communication counterparts to talk to and viewing the status of the communication counterparts. Thus, a user can hold a conversation by using the PoC to select (a single or a group of) communication counterparts in a communication state and press a "talk" button. In other words, the PoC serves as a transceiver mode of a cellular phone, which eliminates the need for dialing the number to call, reduces the time for establishing connection, and allows a simultaneous conversation with a plurality of communication counterparts.

In addition, the conversation via the PoC is often charged lower than a general conversation with a cellular phone. The operation procedure is as follows. That is, a user opens a contact list prepared separately from a general phone book, selects and determines a desired communication counterpart, and presses the talk button to start conversation. If the user selects a plurality of communication counterparts at this time, the user can perform multipoint communications through the user terminal 1.

The technologies in this field have been progressing in consideration of the multipoint communication between terminals of different carriers. Therefore, the system according to the first embodiment is not limited to a system requiring a terminal of the same carrier as the communication counterpart.

In the first embodiment, the user terminal 1 is selected as the communication counterpart, so the information guidance from the information guidance providing device 3 can be provided to the user terminal 1 via the PoC.

Figure 2:
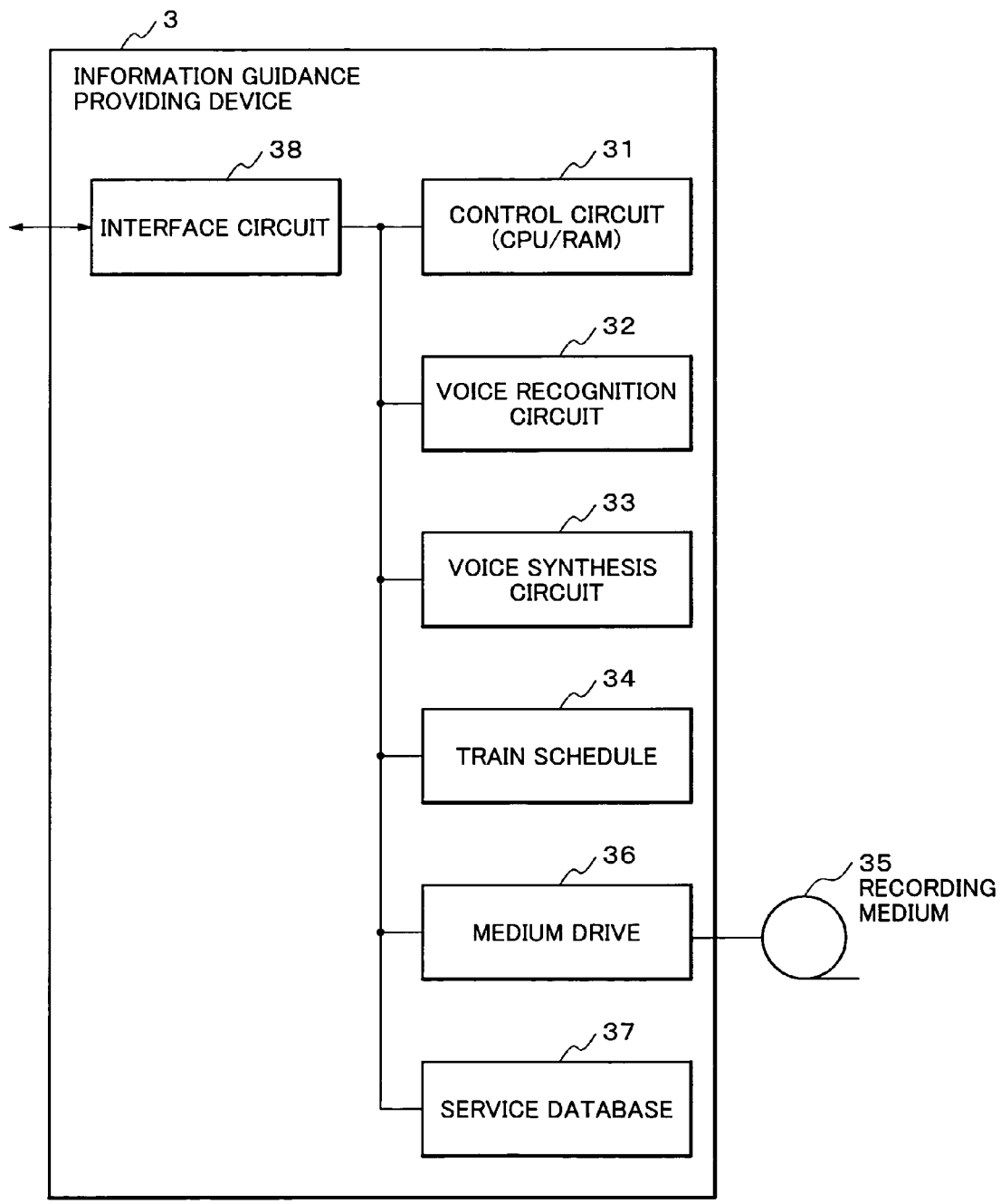
FIG. 2 is a block diagram showing a configuration of an information guidance providing device of FIG. 1.

FIG. 2 is a block diagram showing a configuration of an information guidance providing device 3 of FIG. 1. As shown in FIG. 2, the information guidance providing device 3 is composed of a control circuit 31 (first control circuit), a voice recognition circuit 32, a voice synthesis circuit 33, a train schedule 34, a recording medium 35, a medium drive 36, a service database 37, and an interface circuit 38. The control circuit 31 includes a central processing unit (CPU) and a random access memory (RAM).

In response to an instruction from the control circuit 31, the voice recognition circuit 32 analyzes a voice of a user of a service from the interface circuit 38 (voice from the user terminal 1), and recognizes words spoken by the user. Then, the voice recognition circuit 32 notifies the control circuit 31 of the recognized information.

In response to an instruction from the control circuit 31, the voice synthesis circuit 33 sends a voice that prompts the user of the service to input information or a voice for providing information (voice for an information guidance), to the user terminal 1 through the interface circuit 38.

The train schedule 34 is a database in which running schedules are accumulated, and is allocated to an area within a non-volatile medium drive (for example, a magnetic disk drive or an optical disk drive) (not shown). The train schedule 34 may be replaced by a database in which information items for providing an information guidance service (including information on facilities around a station, in a downtown area, or the like, and information guidance service on exhibits in a museum, an art gallery, or the like) are accumulated.

The control circuit 31 performs an information guidance service by causing the CPU to execute a program stored in the recording medium 35 (for example, a CD-ROM or a DVD). In other words, the control circuit 31 operates under program control by the CPU. The control circuit 31 controls input/output of a voice signal and respective functions (information guidance service) described above through the voice recognition circuit 32 and the voice synthesis circuit 33. The CPU within the control circuit 31 performs the above-mentioned control by moving the program of the recording medium 35 onto the RAM within the control circuit 31 through a recording medium reader (not shown), and executing the program.

The medium drive 36 is a device (for example, a DVD reader or a CD-ROM reader) for reading a program written in the recording medium 35.

The service database 37 stores various voice data pieces used as a basis of inquiries to the user terminal 1 in the course of the information guidance service. The term "various voice data pieces" used herein includes data for checking a get-on station, data for checking a get-off station, data for checking a get-on time, and data for checking a wish for a transit guidance.

Under control of the control circuit 31, the interface circuit 38 exchanges data with the PoC server 2, the train management device 4, etc. The exchange of data in this case is not particularly defined, but in the first embodiment, the communications compatible with the standards IEEE 802.3. Upon reception of a packet containing voice data, the interface circuit 38 decapsulates the packet and passes the extracted voice data to the voice recognition circuit 32 through the control circuit 31. The interface circuit 38 also capsulates voice data received from the voice synthesis circuit 33 and sends the resultant packet. Accordingly, the control circuit 31 communicates with another device (including the user device 1) via the PoC server 2 with PoC communication through the interface circuit 38.

The PoC server 2 of FIG. 1 includes a control circuit 21 (second control circuit) for performing a PoC service. The control circuit 21 performs the PoC service by causing a CPU (not shown) to execute a program. The control circuit 21 of the PoC server 2 in this case performs relay between a plurality of user terminals 1 and the information guidance providing device 3. In other words, the control circuit 21 controls the transceiver mode communication with the PoC function to relay between a plurality of user terminals 1 and the information guidance providing device 3.

Figure 3:
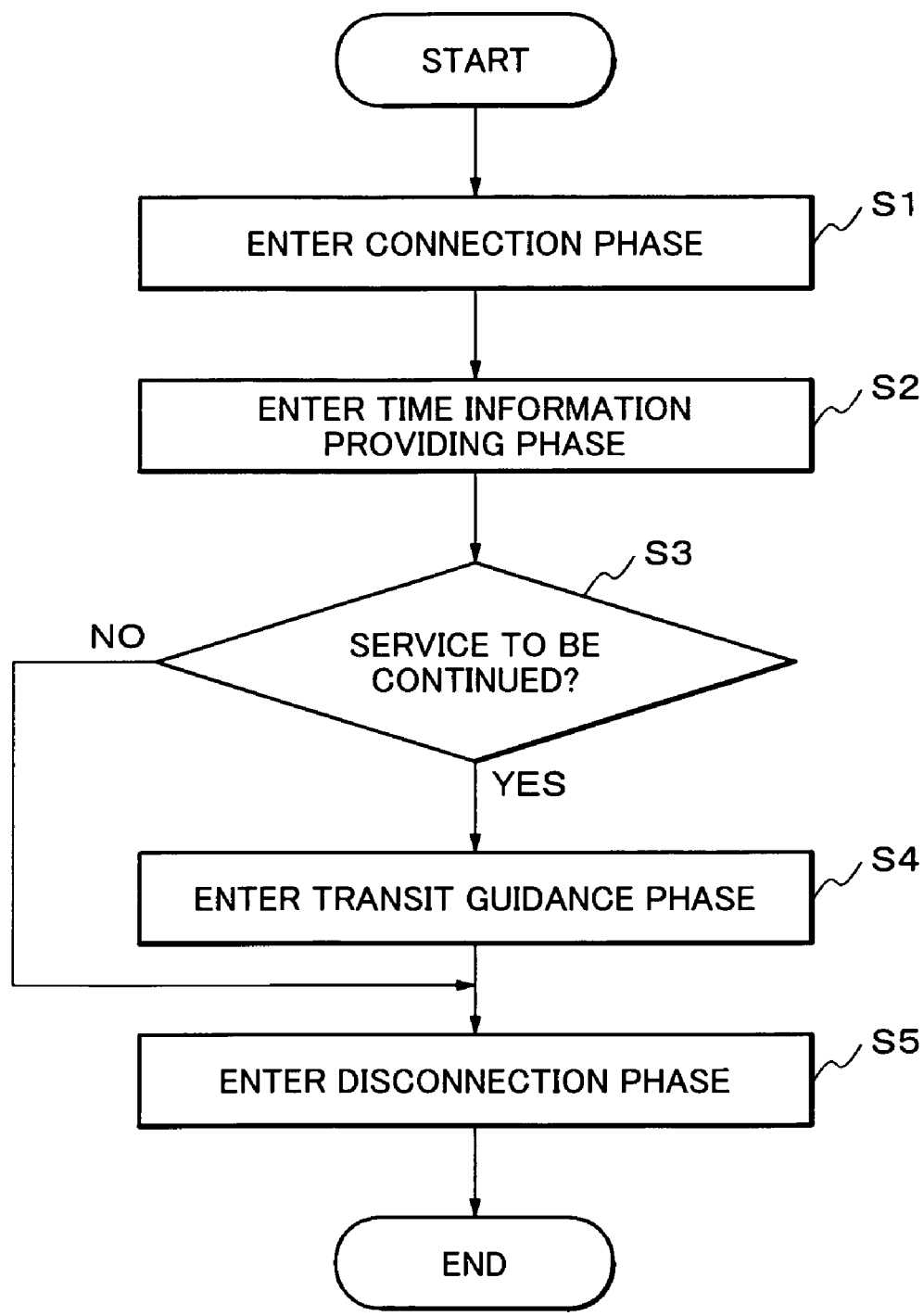
FIG. 3 is a flowchart showing how the information guidance providing device operates according to the first embodiment of the present invention.
Figure 4:
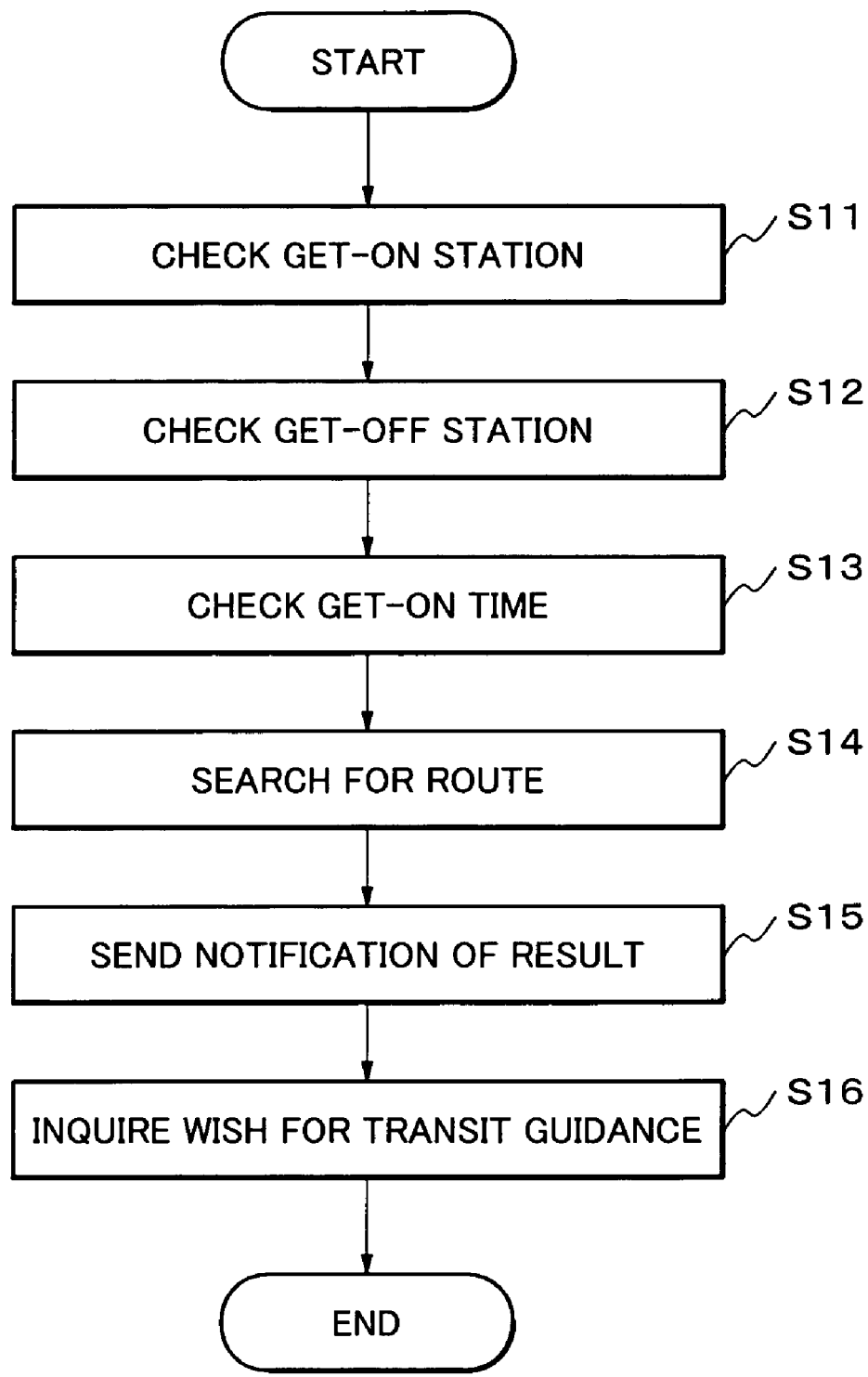
FIG. 4 is a flowchart showing how the information guidance providing device operates for providing time information according to the first embodiment of the present invention.
Figure 5:
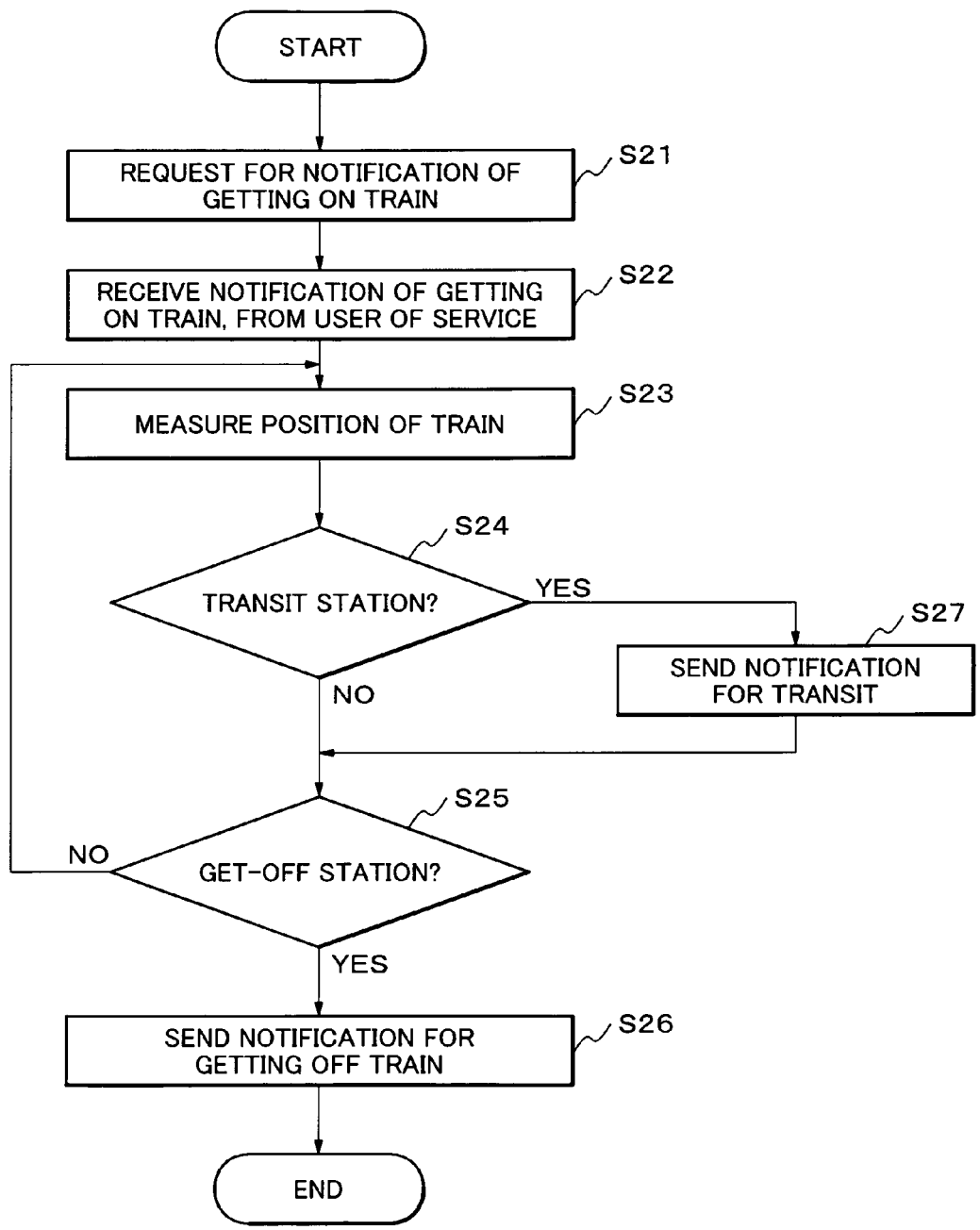
FIG. 5 is a flowchart showing an operational example of how the information guidance providing device performs transit guidance according to the first embodiment of the present invention.

FIG. 3 is a flowchart showing how the information guidance providing device 3 operates according to the first embodiment of the present invention. FIG. 4 is a flowchart showing how the information guidance providing device 3 operates for providing time information according to the first embodiment of the present invention. FIG. 5 is a flowchart showing an operational example of how the information guidance providing device 3 performs transit guidance according to the first embodiment of the present invention.

Next, FIGS. 1 to 5 will be referenced to describe how the system operates in the information guidance service according to the first embodiment of the present invention. The processings shown in FIGS. 3 to 5 are implemented by causing the control circuit 31 to execute a program stored in the recording medium 35.

FIG. 3 shows an example of the information guidance service provided by the information guidance providing device 3. The information guidance service includes a connection phase (step S1 of FIG. 3), a time information providing phase (step S2 of FIG. 3), and a transit guidance phase (step S4 of FIG. 3).

First, the user of the service uses the user terminal 1 (cellular phone) having the PoC function to connect through the PoC server 2 to the information guidance providing device 3 that provides the information guidance service of this embodiment (step S1 of FIG. 3).

After that, for charging the user terminal 1 for using the service, the control circuit 21 of the PoC server 2 activates a timer (not shown) to start monitoring voices each time voice data from the information guidance providing device 3 or the user terminal 1 is detected. In other words, the control circuit 21 of the PoC server 2 charges the user terminal 1 for a time period during which the timer is activated. The control circuit 21 of the PoC server 2 does not charge the user terminal 1 when a timeout occurs before the voice data from the information guidance providing device 3 or the user terminal 1 within a predetermined time period after the timer is activated. The term "predetermined time period" used herein represents a supposed time period during which the voice is being heard from the user terminal 1. Examples of the method of calculating the assumed time period adopted in this case include a method in which a length of the voice data received by the control circuit 21 of the PoC server 2 is calculated, and the calculated length is converted into a timer value.

When connected to the user terminal 1, the control circuit 31 of the information guidance providing device 3 starts a time information providing (step S2 of FIG. 3). Herein, the voice of the information guidance providing device 3 is generated by the voice synthesis circuit 33, and the voice of the user of the service (voice from the user terminal 1) is recognized by the voice recognition circuit 32. Meanwhile, various announcements (voice signals) directed from the information guidance providing device 3 to the user terminal 1 are sent to the user terminal 1 via the PoC. In this case, the information guidance providing device 3 is in a state of one-way communications toward the user terminal 1 as in the case where a PoC talk button is pressed.

FIG. 4 shows an example of how the information guidance providing device 3 operates in the time information providing phase. First, the control circuit 31 of the information guidance providing device 3 reads from the service database 37 data for inquiring a get-on station from the user terminal 1. The control circuit 31 generates voice data in the voice synthesis circuit 33 on the basis of the read data, and sends the voice data to the user terminal 1 through the PoC server 2. Upon reception of the voice data, the user terminal 1 converts the voice data into a voice signal and outputs the voice signal (step S11 of FIG. 4).

Subsequently, the control circuit 31 of the information guidance providing device 3 reads from the service database 37 data for inquiring a get-off station from the user terminal 1. The control circuit 31 generates voice data (packetized) in the voice synthesis circuit 33 on the basis of the read data, and sends the voice data to the user terminal 1 through the PoC server 2. Upon reception of the voice data, the user terminal 1 converts the voice data into an analog voice signal and outputs the converted voice signal (step S12 of FIG. 4).

Further, the control circuit 31 of the information guidance providing device 3 reads from the service database 37 data for inquiring a scheduled get-on time. The control circuit 31 generates voice data (packetized) in the voice synthesis circuit 33 on the basis of the read data, and sends the voice data to the user terminal 1 through the PoC server 2. Upon reception of the voice data, the user terminal 1 converts the voice data into an analog voice signal and outputs the converted voice signal (step S13 of FIG. 4).

The control circuit 31 of the information guidance providing device 3 receives voice data from the user terminal. 1 through the interface circuit 38 as responses to the inquiries of steps S11, S12, and S13. Then, the control circuit 31 causes the voice recognition circuit 32 to analyze the voice data and recognize information items including the get-on station (answer to step S11), the get-off station (answer to step S12), and the scheduled get-on time (answer to step S13). The control circuit 31 performs a search for a route based on the information (get-on station, get-off station, and scheduled get-on time) thus obtained from the user terminal 1, the information of the train schedule 34, and the information from the train management device 4 (step S14 of FIG. 4), and reads data for notification of the resultant from the service database 37. The control circuit 31 generates voice data in the voice synthesis circuit 33 on the basis of the read data, and sends the voice data to the user terminal 1 through the PoC server 2. Upon reception of the voice data, the user terminal 1 converts the voice data into an analog voice signal and outputs the converted voice signal (step S15 of FIG. 4).

The control circuit 31 generates in the voice synthesis circuit 33 voice data for checking whether or not the user terminal 1 wishes to proceed to the transit guidance phase, and sends the voice data to the user terminal 1 through the PoC server 2. Upon reception of the voice data, the user terminal 1 converts the voice data into an analog voice signal and outputs the converted voice signal (step S16 of FIG. 4). If the user terminal 1 wishes to proceed to the transit guidance phase (step S3 of FIG. 3), the control circuit 31 of the information guidance providing device 3 proceeds to the transit guidance phase (step S4 of FIG. 3). When a voice signal indicating that the user terminal 1 does not wish to proceed to the transit guidance phase is inputted from the user terminal 1, the control circuit 31 of the information guidance providing device 3 ends the above-mentioned information guidance service.

FIG. 5 shows an example of how the information guidance providing device 3 operates in the transit guidance phase. First, in order to learn that the user of the service has got on the train 5, the control circuit 31 of the information guidance providing device 3 generates voice data for obtaining a notification of getting on the train 5 in the voice synthesis circuit 33, and sends the voice data to the user terminal 1 through the PoC server 2. Accordingly, the control circuit 31 makes an announcement to request the user terminal 1 to let the control circuit 31 know when the user gets on the train 5 (step S21 of FIG. 5).

Having received from the user terminal 1 the packetized voice signal indicating the notification that the user of the service has got on the train 5 (step S22 of FIG. 5), the control circuit 31 of the information guidance providing device 3 obtains information on the running of the train 5 from the train management device 4, and searches the train schedule 34 based on the obtained information on the running and the information (get-on station, get-off station, and scheduled get-on time) obtained from the user terminal 1. Accordingly, the control circuit 31 measures a transit station and an arrival time at the get-off station (step S23 of FIG. 5).

In the case where the next station is the transit station, the control circuit 31 of the information guidance providing device 3 recognizes the running position by calculating a differential time period between the current time and the measured time at which the train 5 is to arrive at the next transit station. When the calculated time period becomes a predetermined time period, the control circuit 31 detects that the train 5 has reached the vicinity of the transit station (step S24 of FIG. 5). Further, the control circuit 31 generates in the voice synthesis circuit 33 voice data for notifying the user that the next station is the transit station, and sends the voice data to the user terminal 1 through the PoC server 2. Upon reception of the voice data, the user terminal 1 converts the voice data into an analog voice signal and outputs the converted voice signal as a voice (step S27 of FIG. 5).

Other methods than to detect an approach based on the measurement by the control circuit 31 may be used as the method of detecting that the train 5 is approaching the transit station. For example, the control circuit 31 of the information guidance providing device 3 may receive positional information on the train 5 from the train management device 4, calculate a distance to the next transit station based on the positional information, and detect the approach to the next transit station when the calculated distance becomes a predetermined distance.

Further, in the case where the next station is the get-off station (it is detected that the train has reached the vicinity of the get-off station) (step S25 of FIG. 25), the control circuit 31 of the information guidance providing device 3 generates in the voice synthesis circuit 33 voice data for notifying the user that the next station is the get-off station, and sends the voice data to the user terminal 1. Upon reception of the voice data, the user terminal 1 converts the voice data into an analog voice signal and outputs the converted-voice signal to the user terminal 1 (step S26 of FIG. 5).

Finally, the user of the service disconnects the user terminal 1 from the PoC server 2 and the information guidance providing device 3 (step S5 of FIG. 3). The user terminal 1 is charged for the time periods during which the voices from the user terminal 1 and the information guidance providing device 3 are being recognized by the PoC server 2.

Figure 6:
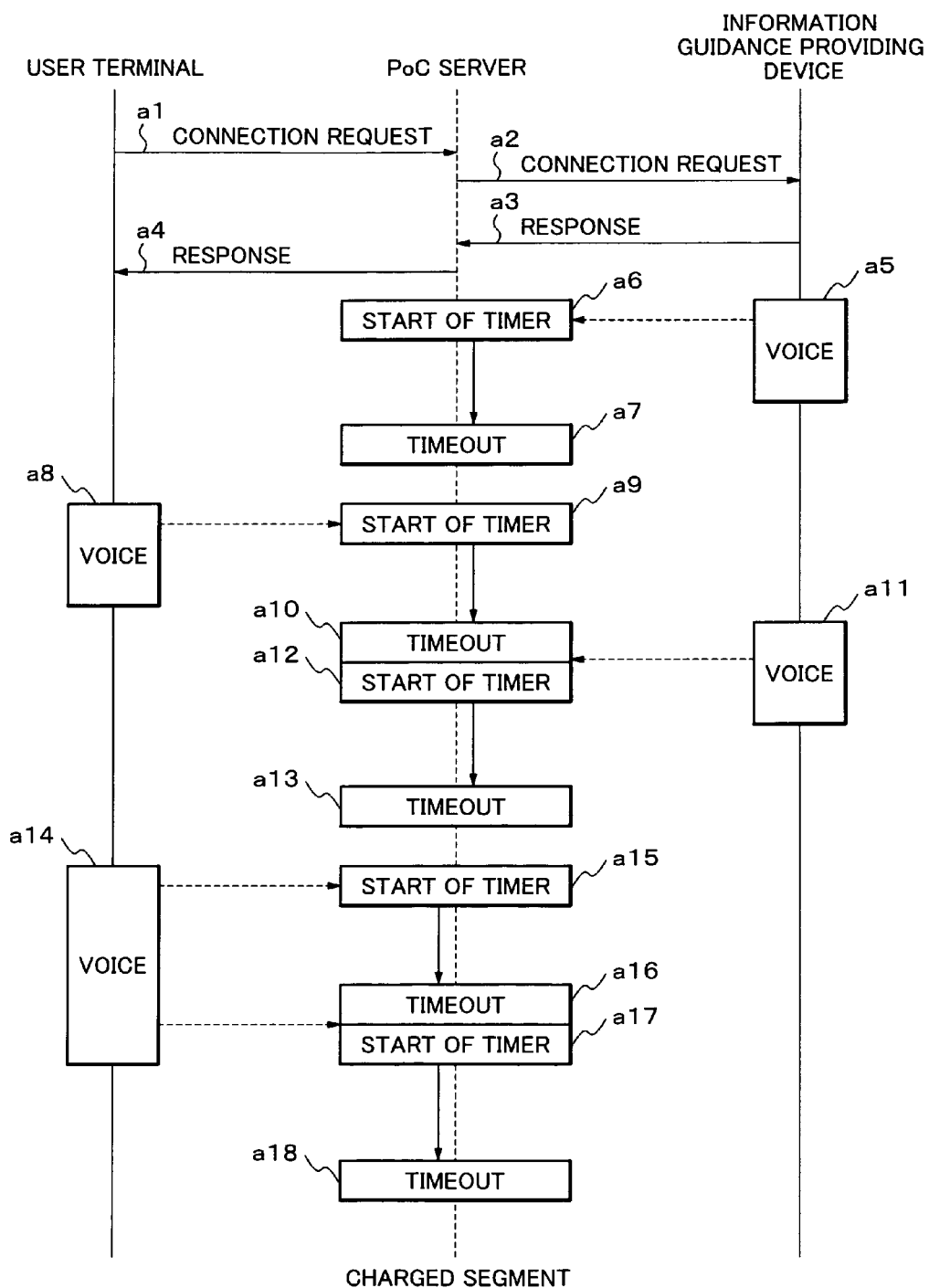
FIG. 6 is a sequence chart showing a mechanism of charging for the information guidance service system according to the first embodiment of the present invention.

FIG. 6 is a sequence chart showing a mechanism of charging for the information guidance service system according to the first embodiment of the present invention. FIGS. 1 to 6 will be referenced to describe the mechanism of charging for the information guidance service system according to the first embodiment of the present invention.

First, the user terminal 1 requests the PoC server 2 for connection to the information guidance providing device 3 (a1 of FIG. 6). In response to the request from the user terminal 1, the PoC server 2 requests the information guidance providing device 3 for the connection (a2 of FIG. 6). Upon reception of the request for the connection from the PoC server 2, the information guidance providing device 3 returns a response to the PoC server 2 (a3 of FIG. 6). The PoC server 2 notifies the user terminal 1 that the response has been sent from the information guidance providing device 3 (a4 of FIG. 6).

When the voice signal is inputted from the information guidance providing device 3, the PoC server 2 starts charging for a predetermined time period (a5 and a6 of FIG. 6). After the predetermined time period has elapsed, when no more voice signal is inputted to the PoC server 2, the PoC server 2 stops the charging (a7 of FIG. 6).

When another voice signal is inputted to the PoC server 2, the PoC server 2 starts the charging (a8 and a9 of FIG. 6). After a predetermined time period has elapsed (a10 of FIG. 6), when there is another voice signal being inputted to the PoC server 2, the PoC server 2 again starts the charging for the predetermined time period (a11 to a13 and a14 to a18 of FIG. 6).

Figure 7:
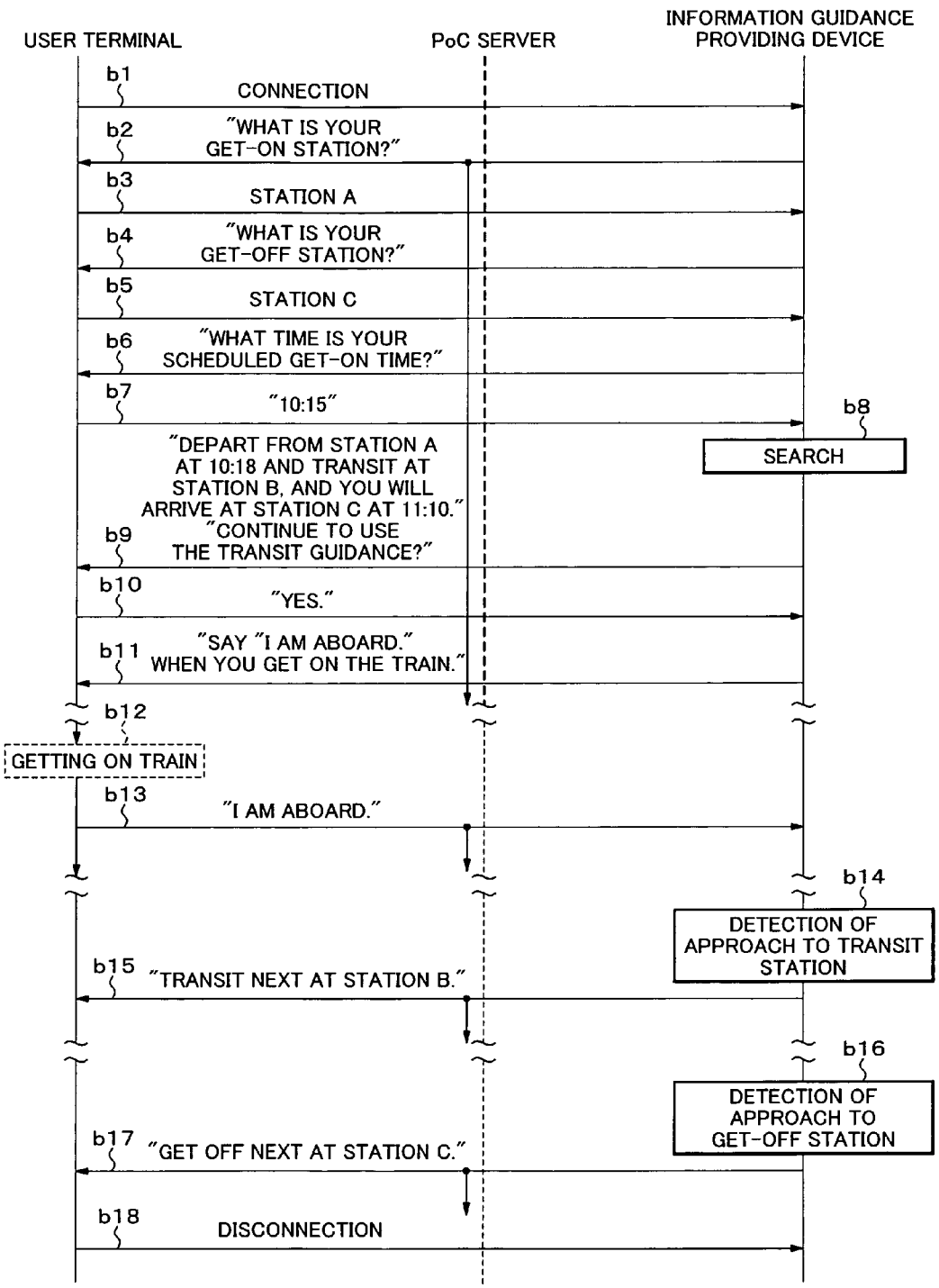
FIG. 7 is a sequence chart showing a specific example of the information guidance service system according to the first embodiment of the present invention.

FIG. 7 is a sequence chart showing a specific example of the information guidance service system according to the first embodiment of the present invention. FIGS. 1, 2, and 7 will be referenced to describe an operation of the information guidance service system according to the first embodiment of the present invention.

The user terminal 1 connects to the information guidance providing device 3 through the PoC server 2 (b1 of FIG. 7). The information guidance providing device 3 sends an announcement "What is your get-on station?" to the user terminal 1 as a voice signal (b2 of FIG. 7). The user terminal 1 returns a voice ("Station A") inputted from the user to the information guidance providing device 3 through the PoC server 2 (b3 of FIG. 7).

Then, the information guidance providing device 3 sends an announcement "What is your get-off station?" to the user terminal 1 as a voice signal (b4 of FIG. 7). The user terminal 1 returns a voice ("Station C") inputted from the user to the information guidance providing device 3 through the PoC server 2 (b5 of FIG. 7).

Further, the information guidance providing device 3 sends an announcement "What time is your scheduled get-on time?" to the user terminal 1 as a voice signal (b6 of FIG. 7). The user terminal 1 returns a voice ("10:15") inputted from the user to the information guidance providing device 3 through the PoC server 2 (b7 of FIG. 7).

After obtaining answers to the inquiries from the user, the information guidance providing device 3 searches the train schedule 34 based on the answers (b8 of FIG. 7), and sends the search results ("Depart from Station A at 10:18 and transit at Station B, and you will arrive at Station C at 11:10.") and an announcement "Continue to use the transit guidance?" to the user terminal 1 as voice signals (b9 of FIG. 7). The user terminal 1 returns a specific voice (for example, "Yes.") inputted from the user with respect to the announcement, to the information guidance providing device 3 through the PoC server 2 (b10 of FIG. 7).

The information guidance providing device 3 sends an announcement "Say 'I am aboard.' when you get on the train." to the user terminal 1 as a voice signal (b11 of FIG. 7). When the user of the user terminal 1 gets on the train 5 (b12 of FIG. 7), the user terminal 1 returns a specific voice (for example, "I am aboard.") inputted from the user to the information guidance providing device 3 through the PoC server 2 (b13 of FIG. 7).

Upon detection that the train 5 is approaching the transit station (b14 of FIG. 7), the information guidance providing device 3 sends an announcement "Transit next at Station B." to the user terminal 1 as a voice signal (b15 of FIG. 7).

Further, upon detection that the train 5 is approaching the get-off station (b16 of FIG. 7), the information guidance providing device 3 sends an announcement "Get off next at Station C." to the user terminal 1 as a voice signal (b17 of FIG. 7). Having arrived at the get-off station, the user of the user terminal 1 disconnects from the information guidance providing device 3 (b18 of FIG. 7).

As described above, in the first embodiment, the charging is not made for the connected time period via the PoC. To be specific, in the first embodiment, the PoC function of the user terminal 1 is used for notifications of a transit guidance and a get-off guidance as voices, so the charging can be made only for the time period during which the voices are being inputted to the PoC server 2. Therefore, the user can use the service continuously for a long time period without paying particular care to communication fees.

Further, the first embodiment differs from other techniques in which a cellular phone is operated with troublesome character input in data communications using a browser. To be specific, in the first embodiment, the PoC function of the user terminal 1 is used for notifications of a transit guidance and a get-off guidance as voices, so the responses can be made as voices. Therefore, the service can be improved in its operability.

Second Embodiment

Figure 8:
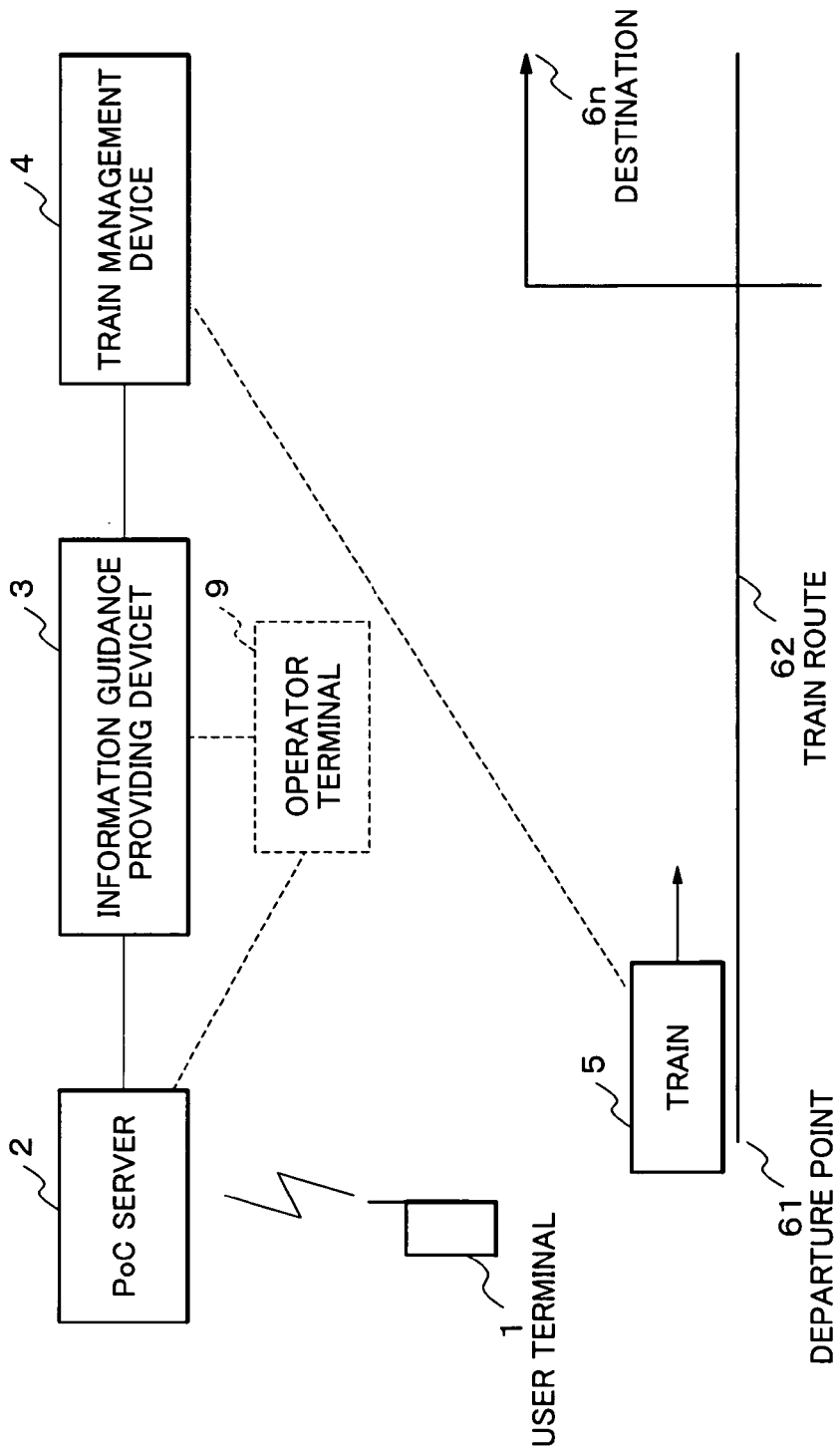
FIG. 8 is a block diagram showing a configuration of an information guidance service system according to a second embodiment of the present invention.

FIG. 8 is a block diagram showing a configuration of an information guidance service system according to a second embodiment of the present invention. Referring to FIG. 8, the information guidance service system according to the second embodiment of the present invention includes the user terminal 1, the PoC server 2, an information guidance providing device 7, the train management device 4, and an operator terminal 9.

When the user terminal 1 calls the operator terminal 9 through the information guidance providing device 7, the operator terminal 9 can deliver an announcement as a voice signal to the user terminal 1 instead of the information guidance providing device 7. The operator terminal 9 can handle matters that cannot be handled by the information guidance providing device 7 and troubles in the use of services.

Figure 9:
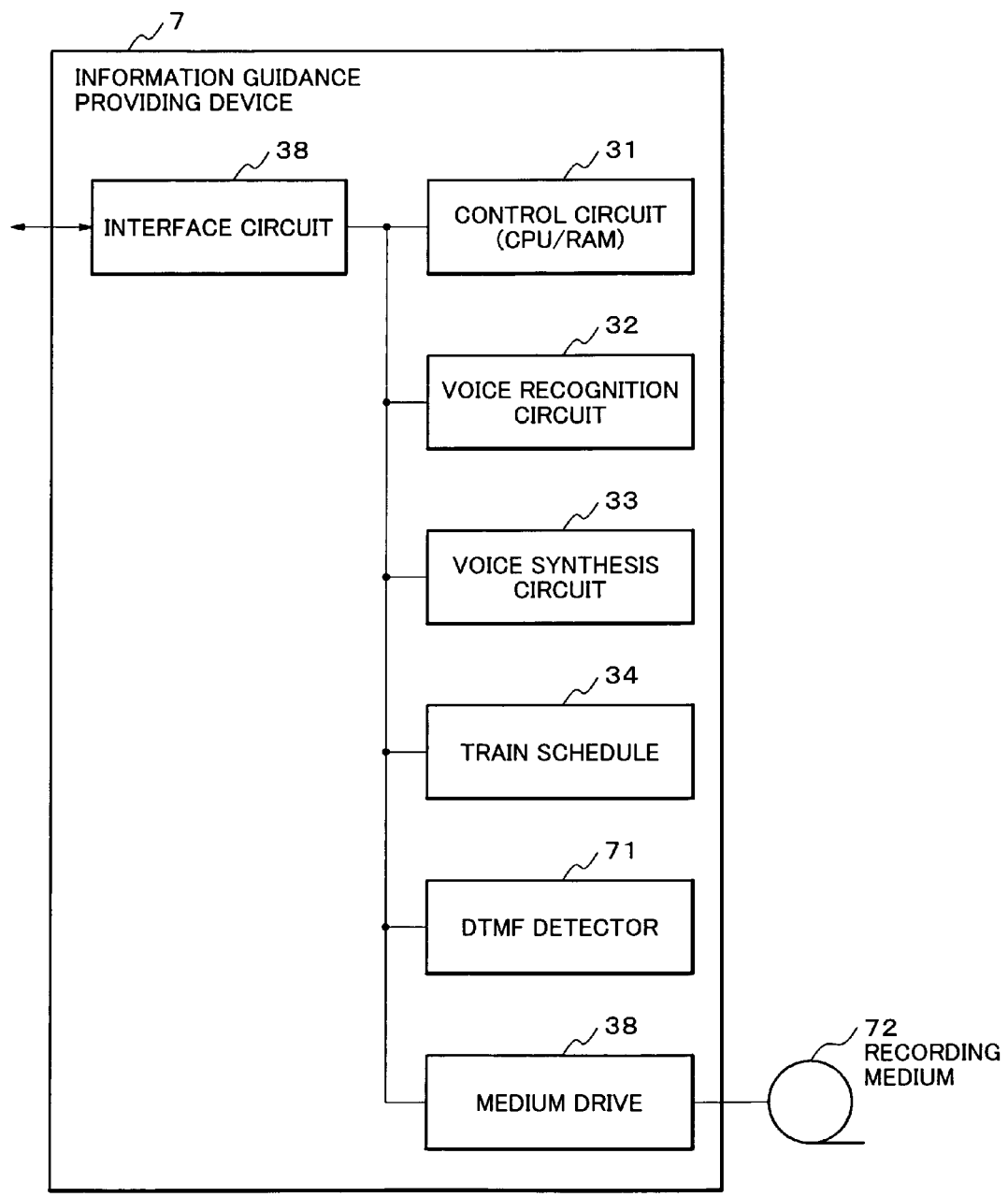
FIG. 9 is a block diagram showing a configuration of an information guidance providing device of FIG. 8.

FIG. 9 is a block diagram showing a configuration of an information guidance providing device 7 of FIG. 8. Referring to FIG. 9, the information guidance providing device 7 includes the control circuit (CPU/RAM) 31, the voice recognition circuit 32, the voice synthesis circuit 33, the train schedule 34, a dial tone multi frequency (DTMF) detector 71, and a recording medium 72.

The voice synthesis circuit 33 of the information guidance providing device 7 instructs the user terminal 1 to input a station name or time as a DTMF tone. The DTMF detector 71 analyzes the DTMF tone sent from the user terminal 1, and notifies the control circuit 31 of the analysis results. The control circuit 31 then provides a service based on the analysis results obtained from the DTMF detector 71. Numbers for respective stations represent services in this case, and their assignment is performed in advance. In other words, compared with the first embodiment in which the control circuit 31 collects information as a voice, the operation of the control circuit 31 in the second embodiment differs from the first embodiment in that the control circuit 31 collects information as a DTMF tone from the user terminal 1. However, in the second embodiment, the control circuit 31 provides a service based on the collected information similarly to the first embodiment. Thus, the second embodiment is the same as the first embodiment except that the control circuit 31 collects information from the user terminal 1 in a different manner. Therefore, the control circuit 31 searches the train schedule 34 (database) on the basis of the information (in this case, get-on station, get-off station, and scheduled get-on time) as a DTMF tone obtained from the user terminal 1, thereby providing a guidance service for transit information, get-off information, or the like.

Next, FIG. 7 will be referenced to describe how the system operates in the information guidance service according to the second embodiment.

The user terminal 1 connects to the information guidance providing device 7 through the PoC server 2 (b1 of FIG. 7). The information guidance providing device 7 sends an announcement "What is your get-on station? Press the dial button to enter." to the user terminal 1 as a voice signal (b2 of FIG. 7). The user terminal 1 returns information ("Station A") inputted from the user to the information guidance providing device 7 through the PoC server 2 (b3 of FIG. 7). In this case, the information guidance providing device 7 may let the user terminal 1 to input characters whose number is limited (to, for example, three from the first), announce station name candidates based on the characters to the user terminal 1, and cause the user terminal 1 to extract one from the announced station name by a corresponding number.

Then, the information guidance providing device 7 sends an announcement "What is your get-off station? Press the dial button to enter." to the user terminal 1 as a voice signal (b4 of FIG. 7). The user terminal 1 returns information ("Station C") inputted from the user to the information guidance providing device 7 through the PoC server 2 (b5 of FIG. 7). In this case, the information guidance providing device 7 may let the user terminal 1 to input characters whose number is limited (to, for example, three from the first), announce station name candidates based on the characters to the user terminal 1, and cause the user terminal 1 to extract one from the announced station name by a corresponding number.

Further, the information guidance providing device 7 sends an announcement "What time is your scheduled get-on time? Press the dial button to enter." to the user terminal 1 as a voice signal (b6 of FIG. 7). The user terminal 1 returns information (for example, "1015" for "10:15") inputted from the user to the information guidance providing device 7 through the PoC server 2 (b7 of FIG. 7).

After obtaining answers to the inquiries from the user, the information guidance providing device 7 searches the train schedule 34 based on the answers (b8 of FIG. 7), and sends the search results ("Depart from Station A at 10:18 and transit at Station B, and you will arrive at Station C at 11:10.") and an announcement "Continue to use the transit guidance? If so, press 1. If not, press 0" to the user terminal 1 as voice signals (b9 of FIG. 7). The user terminal 1 returns information (for example, "1") inputted from the user with respect to the announcement, to the information guidance providing device 7 through the PoC server 2 (b10 of FIG. 7).

The information guidance providing device 7 sends an announcement "Press 1 when you get on the train." to the user terminal 1 as a voice signal (b11 of FIG. 7). When the user of the user terminal 1 gets on the train 5 (b12 of FIG. 7), the user terminal 1 returns information (for example, "1") inputted from the user to the information guidance providing device 7 through the PoC server 2 (b13 of FIG. 7).

Upon detection that the train 5 is approaching the transit station (b14 of FIG. 7), the information guidance providing device 7 sends an announcement "Transit next at Station B." to the user terminal 1 as a voice signal (b15 of FIG. 7).

Further, upon detection that the train 5 is approaching the get-off station (b16 of FIG. 7), the information guidance providing device 7 sends an announcement "Get off next at Station C." to the user terminal 1 as a voice signal (b17 of FIG. 7). Having arrived at the get-off station, the user of the user terminal 1 disconnects from the information guidance providing device 7 (b18 of FIG. 7).

According to the first and second embodiments, it is possible that in the case where the train 5 is not on schedule due to an accident, the information guidance providing device 3, 7 learns the running status based on the information from the train management device 4, notifies the user terminal 1 of the running status, and if there is another route other than the previously notified route, further notifies the user terminal 1 of information on the route.

Further, according to the first and second embodiments, it is possible that a fare is notified to the user terminal1 upon providing the time information, or the information on the routes is notified to the user terminal 1 when the user can select a plurality of routes upon providing the time information. And it is also possible to make the user select either of the route guidance information which considers time or it which considers the fare as a priority, for the route guidance information provided for the user.

Further, according to the first and second embodiments, it is possible that in the case where the communications via the PoC is interrupted due to the line status during travel on the train 5, the information guidance providing device 3, 7 stores the service that has been provided before disconnection, thereby allowing the continual use thereof after the line connection is recovered.

Further, according to the first and second embodiments, it is possible that the information guidance providing device 3, 7 sends to the user terminal 1 maps (including a map indicating the inside of the station premises) and photos of the transit station and the get-off station, thereby showing a transit route.

As has been described above, according to the first and second embodiments of the present invention, the PoC function of the user terminal 1 is used for notifying the user terminal 1 of a transit guidance and a get-off guidance as voice signals. Therefore, there is no need to provide the premises of each station with the device for obtaining information on a departure station and a destination station.

Further, according to the first and second embodiments of the present invention, the PoC function of the user terminal 1 is used for notifications of a transit guidance and a get-off guidance as voices, so the responses can be made as voices. Therefore, it is possible to reduce the time for obtaining information.

Furthermore, according to the first and second embodiments of the present invention, the PoC function of the user terminal 1 is used for notifications of a transit guidance and a get-off guidance as voices, so the charging can be made only for the time period during which the voices are being processed. Therefore, it is possible to reduce the communication fees for obtaining information.

The above description has been made on the services of a transit guidance and a get-off guidance for the train. Alternatively, the present invention may be applied to the services of a transit guidance and a get-off guidance for a public transportation such as a bus or an airplane. In this case, by replacing the train 5 with a vehicle of public transportation such as an airplane, it is possible to realize the services of a transit guidance and a get-off guidance with ease.

Further, the present invention is applicable to not only the above-mentioned system for providing the public transportation transit guidance service, but also a system for providing an information guidance service on facilities around a station, in a downtown area, or the like, a system for providing an information guidance service on exhibits in a museum, an art gallery, or the like, and other such systems.

Further, it is the inventor's intent to retain all equivalents of the claimed invention even if the claims are amended during prosecution.

What is claimed is:

1. An information guidance service system for providing an information guidance service to a user terminal having a push-to-talk over cellular (PoC) function with voice guidance information, comprising an information guidance providing device for providing guidance information by voice data in response to voice data inputted from the user terminal using a one-way communication by transceiver mode communication of the PoC function, including a voice recognition circuit for recognizing the voice data inputted from the user terminal for the information guidance service;

a service data base for storing voice data pieces relating to the information guidance service;

a voice synthesis circuit for synthesizing the voice data relating to the information guidance service and outputting synthesized voice data to the user terminal; and a control circuit for controlling the information guidance service provided by the information guidance providing device through the voice recognition circuit and the voice synthesis circuit; and a PoC server for controlling the one-way communication by transceiver mode communication of the PoC function to relay voice data between the information guidance providing device and the user terminal, monitoring the voice data transmitted between the information guidance providing device and the user terminal, and being provided with a timer which is activated for a predetermined time period at each time the voice data is detected, wherein the PoC server stops the timer when no voice data is detected after the predetermined time period has elapsed, starts the timer again when the voice data is detected after the predetermined time period has elapsed and performs charging for the user terminal while the timer is being activated, and wherein the predetermined time period counted by the timer represents a supposed time period during which the voice is being heard from the user terminal and calculated based on a length of the voice data having been received.

2. The information guidance service system according to claim 1, further comprising:

a time schedule database provided in the information guidance providing device for accumulating running schedules of a vehicle of public transportation; and a vehicle management device connected with the information guidance providing device for managing running status of the vehicle, wherein the information guidance providing device provides time information on the vehicle to the user terminal as the information guidance service.

3. The information guidance service system according to claim 2, wherein the control circuit obtains information on a get-on place, a get-off place, and a scheduled get-on time for the vehicle based on the voice data transmitted from the user terminal, searches for a route based on the obtained information from the user terminal by referring to information of the time schedule database and the vehicle management device, and provides the voice data of time information on the vehicle to the user terminal.

4. The information guidance service system according to claim 3, wherein the information guidance providing device provides transit guidance information on the vehicle to the user terminal as the information guidance service while a user of the user terminal is aboard the vehicle based on notification of getting on the vehicle from the user terminal and detected current position of the vehicle through the vehicle management device.

5. The information guidance system according to claim 4, wherein the information guidance providing device notifies the user terminal about a transit place and the get-off place by the voice data when the vehicle is approaching the respective places.

6. The information guidance service system according to claim 5, wherein the information guidance providing device further comprises:

a DTMF detector for receiving and analyzing a dial tone multi frequency (DTMF) signal transmitted from the user terminal for inputting information as the voice data.

7. An information guidance service method for providing an information guidance service to a user terminal having push-to-talk over cellular (PoC) function with voice guidance information, comprising:

connecting the user terminal to an information guidance providing device via a PoC server which controls a one-way communication by transceiver mode communication of the PoC function to relay voice data between the information guidance providing device and the user terminal;

performing communications using said respective one-way communications in such a manner that guidance information is provided from the information guidance providing device by voice data to the user terminal in accordance with inputted information by voice data inputted from the user terminal;

monitoring the voice data transmitted between the information guidance providing device and the user terminal and activating a timer for a predetermined time period at each time the voice data is detected at the PoC server;

stopping the timer when no voice data is detected after the predetermined time period has elapsed, starting the timer again when the voice data is detected after the predetermined time period has elapsed and performing charging the user terminal while the timer mer is being activated at the PoC server;

recognizing the voice data inputted from the user terminal for the information guidance service in the information guidance providing device;

synthesizing voice data pieces stored in the information guidance providing device relating to the information guidance service to generate synthesized voice data; and outputting the synthesized voice data to the user terminal from the information guidance providing device, wherein the predetermined time period counted by the timer represents a supposed time period during which the voice is being heard from the user terminal and calculated based on a length of the voice data having been received.

8. The information guidance service method according to claim 7, wherein the information guidance providing device provides time information on a vehicle of public transportation as the information guidance service by referring to running schedules accumulated in a time schedule database provided in the information guidance providing device and running status of the vehicle managed in a vehicle management device connected with the information guidance providing device, and the method further comprising:

obtaining information on a get-on place, a get-off place, and a scheduled get-on time for the vehicle at the information guidance providing device based on the voice data transmitted from the user terminal;

searching for a route based on the obtained information from the user terminal by referring to information of the time schedule database and the vehicle management device; and providing the voice data of time information on the vehicle to the user terminal.

9. The information guidance service method according to claim 8, wherein the information guidance providing device provides transit guidance information on the vehicle as the information guidance service to the user terminal while a user of the user terminal is aboard the vehicle based on notification of getting on the vehicle from the user terminal and detected current position of the vehicle through the vehicle management device, and the method further comprising:

notifying the user terminal about a transit place and the get-off place by the voice data when the information guidance providing device detects that the vehicle is approaching the respective places.

10. The information guidance service method according to claim 9, wherein the voice data inputted from the user terminal is a dial tone multi frequency (DTMF) signal and analyzed in the information guidance providing device as the voice data.

* * * * *